United States Patent Office 2,983,719
Patented May 9, 1961

2,983,719

HEAT RESISTANT ELASTOMER

Robert P. Cox and Karl R. Guenther, Madison, Wis., assignors to Bjorksten Research Laboratories, Inc., Fitchburg, Wis., a corporation of Illinois No Drawing. Filed Feb. 20, 1956, Ser. No. 566,378

10 Claims. (Cl. 260—86.1)

This invention deals with the production of elastomers that retain their strength and elasticity after prolonged exposure to high temperature or solvents. These elastomers are prepared by vulcanizing copolymers containing silane groups by means of siloxane bridges between adjacent chains, with or without an amine catalyst.

Presently available elastomer materials do not retain their desirable properties after prolonged exposure to elevated temperatures and for solvent action. Among the newly developed elastomers silicone rubbers have low strengths and swell extensively in organic liquids while polyperfluorobutyl acrylate is available only in laboratory quantities and is expensive.

It is a principal object of this invention to prepare elastomers with high resistance to elevated temperatures and solvents. It is a further object of this invention to produce elastomers which are inexpensive, strong, resistant to solvents especially of the diester type of lubricants, and thermally stable. It is also the purpose of the present invention to vulcanize such elastomers in a novel fashion, i. e., through a siloxane bridge between adjacent chains, with or without an amine catalyst. Further objects will become apparent from the following detailed description.

In a preferred embodiment of this invention 0.5–5% of vinyl triethoxy silane is copolymerized with ethyl acrylate.

Milling the polymer with various additives well known in the art and subsequent vulcanization produces elastomers with improved thermal resistance.

The ethyl acrylate may be replaced by any alkyl or aryl acrylate or methacrylate or mixture of these which exhibits rubbery properties when polymerized.

The vinyl triethoxy silane may be replaced by an alkenyl alkoxy silane, which can be polymerized with ethyl acrylate and can later be hydrolyzed to form silanol groups capable of cross-linking.

In place of vinyl triethoxy silanes there may be used other vinyl alkoxy silanes such as vinyl tributoxy silane, or vinyl trimethoxy silane or other alkenyl alkoxy silanes including alkenyl trialkoxy silanes such as allyl, crotonyl or B-chloromethallyl triethoxy silane and trimethoxy silane, including alkenyl dialkoxy silanes such as vinyl dimethoxy methyl silane, allyl diethoxy ethyl silane and vinyl diphenoxy ethyl silane, including alkenyl monoalkoxy dialkyl silanes such as vinyl ethoxy diethyl silane, allyl ethoxy diethyl silane, methallyl methoxy methyl silane and vinyl methoxy dimethyl silane. However, results obtained with silanes containing alkenyl radicals other than the vinyl radical are much less satisfactory than those obtained with those which contain the vinyl radical.

Somewhat different curing conditions are required if in place of an alkenyl alkoxy silane containing three alkoxy groups there is used an alkenyl alkoxy silane which contains one or two alkyl radicals, and correspondingly only two or one alkoxy groups. It may be possible to achieve products having physical properties equal to these achieved with alkenyl trialkoxy silane, particularly vinyl trialkoxy silane but curing can be accomplished only by heating for extremely extended periods. Thus it is preferred to utilize an alkenyl alkoxy silane which is preferably a trialkoxy or at least dialkoxy silane and much preferred to use such a silane wherein the alkenyl group is vinyl. A vinyl halo silane or vinyl amino silane may also be suitable.

The following examples illustrate the invention and show the preparation of the elastomer and the test results obtained with it:

*Example 1*

Vinyl triethoxy silane and ethyl acrylate are copolymerized according to the following polymerization recipe:

1.67% aqueous solution of Santomerse B (sulfonated ester, one of the salts of a homologous series of substituted aromatic sulfonic acids) (sold commercially by Monsanto Chemical Company) _____ milliliters__ 90
3% aqueous solution of $(NH_4)_2S_2O_8$ _____ do____ 10
Monomers _____ grams__ 50
    0.5% vinyl triethoxy silane.
    99.5% ethyl acrylate.
Sharples 3B mercaptan tert dodecylmercaptan sold by Sharples Chemicals Inc_____ gram__ 0.04

The mixture is agitated for 6 hours at 50° C. in an atmosphere of carbon dioxide. The reaction product (the gum rubber) is then steam distilled, coagulated by the addition of NaCl, washed, dried and the following formulations in parts by weight are prepared:

Gum rubber _____ 28
Philblack O (one of a series of furnace carbon blacks) (Phillips Chem. Co.) _____ 7
Sulfur _____ 0.28
Stearic acid _____ 0.28
Trimene base (a reaction product of ethyl chloride, formaldehyde, and ammonia, the structure being complex, sold commercially by Naugatuck Chemical Division of United States Rubber Company) _____ 0.35 and 0.7 (1% and 2% respectively)

Compositions are milled on a warm mill, vulcanized for one hour at 150° C. and tested. The results of these tests are as follows:

| Percent vinyl triethoxy silane | Weight loss (%) after 100 hrs. in air at 350° F. | Tensile strength after 100 hours in air at 350° F. | Flexibility after 100 hours in air at 350° F. |
|---|---|---|---|
| 0.1 | 10 | Too brittle to test | Brittle. |
| 0.25 | 10 | ____do____ | Slightly brittle. |
| 0.5 | 7 | 150 p.s.i | OK. |
| 1.0 | 4 | 400 p.s.i | OK. |
| 1.5 | 3.6 | 350 p.s.i | OK. |
| 2 | 3.5 | 300 p.s.i | OK. |
| 3 | 3.2 | 225 p.s.i | OK. |
| 5 | 3 | 175 p.s.i | Slightly brittle. |
| 10 | 3 | 175 p.s.i | Do. |

In a second series of vulcanizates, the percent trimene base is increased to 2% and it is found that complete vulcanization of the samples can be achieved after only one-half to three-quarters of an hour.

When the trimene base or trimethylene tetramine is omitted from the vulcanization recipe, full strength is not attained until after 1¾ hours of vulcanization.

*Example 2*

Using the emulsion polymerization recipe of Example 1, butylacrylate is co-polymerized with 0–5% vinyl triethoxy silane. The heat stability of the vulcanizates indicates that (a) the presence of vinyl triethoxysilane in the polymeric product greatly increases the thermal stability and (b) the concentration of vinyl triethoxysilane yielding the best properties is .5 to 3%. Although concentrations higher and lower in the range yields materials having thermal stability better than that of polybutylacrylate alone, the thermal stability is superior in this range.

*Example 3*

Using the emulsion polymerization recipe of Example 1, methyl acrylate is co-polymerized with vinyl triethoxysilane, using 0–5% of the latter. The range of optimum properties is found to be in the range of 1–3% vinyl triethoxysilane.

*Example 4*

Beta-chloroethoxyethylacrylate is co-polymerized with vinyl triethoxysilane, using the emulsion polymerization recipe of Example 1. The concentration of the vinyl triethoxysilane is varied from 1–10%. It is found that the presence of the vinyl triethoxysilane yields greatly increased tensile strength after aging at 350° F. and that the optimum range of vinyl triethoxysilane concentration is .4–2.4%.

*Example 5*

A 50–50 mixture of ethyl acrylate and methyl acrylate is copolymerized with a 50–50 mixture of vinyl triethoxysilane and vinyl methyl diethoxysilane, using the emulsion polymerization recipe of Example 1. The concentration of the silane mixture is varied from 0–10%. On the basis of thermal stability, retention of tensile strength and flexibility on aging at 350° F. the optimum concentration range for this silane mixture is found to be 1½–4%.

*Example 6*

Tetrahydrofurfuryl acrylate is co-polymerized with vinyl triethoxysilane, following the emulsion polymerization recipe given in Example 1. The concentration of silane is varied from 0–6%. On the basis of thermal stability tests and retention of tensile strength, the optimum concentration is found to lie in the range 1–2½%.

*Example 7*

Methyl methacrylate is co-polymerized with vinyl triethoxysilane, using the emulsion polymerization recipe of Example 1. After steam distillation, the material is dried and molded into sheets, which are then stored at 350° F. Whereas the sample containing no vinyl triethoxysilane is severely yellowed after 100 hours at this temperature, the silane-containing sheets are still clear and colorless after 250 hours. The optimum concentration is found to be 1.1%.

*Example 8*

Methyl alpha-chloroacrylate is substituted for the methyl methacrylate in Example 7. The final sheets containing vinyl triethoxysilane are found to have greatly increased thermal stability.

*Example 9*

Vinyl triethoxy silane and a 50–50 molar mixture of ethyl acrylate and n-butyl acrylate are copolymerized according to the following polymerization recipe:

1.67% aqueous solution of Santomerse B
    milliliters____ 90
3% aqueous solution of $(NH_4)_2S_2O_8$ ____do_____ 10
Monomers _____grams____ 50
    0.5% vinyl triethoxy silane.
    A 50–50 molar mixture of ethyl
    acrylate and n-butyl acrylate.
Sharples 3B mercaptan _____gram____ 0.04

The mixture is agitated for 6 hours at 50° C. in an atmosphere of carbon dioxide. The reaction product (the gum rubber) is then steam distilled, coagulated by the addition of NaCl, washed, dried and the following formulations in parts by weight are prepared:

Gum rubber _____ 28
Philblack O (Phillips Chem. Co.) _____ 7
Sulfur _____ 0.28
Stearic acid _____ 0.28

Compositions are milled on a warm mill, vulcanized for 2 hours and tested. The results of these tests are as follows:

| Percent vinyl triethoxy silane | Weight loss (percent) after 100 hours in air at 350° F. | Tensile strength after 100 hours in air at 350° F. | Original tensile strength |
|---|---|---|---|
| 0.1 | 12 | Too brittle to test | 300 |
| 0.25 | 10.5 | ____do____ | 350 |
| 0.5 | 8 | 175 p.s.i | 475 |
| 1.0 | 4 | 650 p.s.i | 1,050 |
| 1.5 | 4 | 550 p.s.i | 1,100 |
| 2 | 3.7 | 350 p.s.i | 1,150 |
| 3 | 3.4 | 200 p.s.i | 1,000 |
| 5 | 3.2 | 200 p.s.i | 850 |

Other vulcanizing agents may be used in place of or in addition to trimene base. Such other agents include oxides and both strongly and weakly ionized acids and bases including p-toluene sulfuric acid, p-cumene sulfonic acid, sulfuric acid, phosphoric acid, phosphonic acids, sodium and potassium hydroxides, quaternary ammonium salts, amines, amine hydrochlorides and the like. Sulfur is particularly well known as a vulcanizing agent.

Best results are achieved, however, if no vulcanizing agent is added. This is believed to be because the cross-linking which characterizes vulcanization is accomplished entirely within the copolymer of the invention. Thus it is much preferred to omit entirely, during vulcanization or otherwise, the addition of any vulcanizing agent either as above defined or otherwise. However, in some applications, the vulcanization cycle may be too long. In such cases, a minimum amount of vulcanization catalyst may be added.

Ethyl acrylate is copolymerized with each of the following silane monomers and vulcanized by the methods of Example 9. The properties noted after 100 hours in air at 350° F. are summarized below.

| Monomer | Weight loss (percent) after 100 hours at 350° F. in air | Tensile strength after 100 hours at 350° F. in air |
|---|---|---|
| 1% vinyl ethyl diethoxy silane | 7 | 400 |
| 2% vinyl ethyl diethoxy silane | 6 | 410 |
| 3% vinyl ethyl diethoxy silane | 5.5 | 300 |
| 1% vinyl diethyl ethoxy silane | 9.5 | 350 |
| 2% vinyl diethyl ethoxy silane | 7 | 385 |
| 3% vinyl diethyl ethoxy silane | 6 | 300 |
| 1% vinyl phenyl diethoxy silane | 10 | 160 |
| 2% vinyl phenyl diethoxy silane | 7 | 400 |
| 3% vinyl phenyl diethoxy silane | 5.5 | 300 |
| 1% vinyl diphenyl ethoxy silane | 9.5 | 150 |
| 2% vinyl diphenyl ethoxy silane | 8 | 210 |
| 3% vinyl diphenyl ethoxy silane | 7 | 270 |
| 1% allyl triethoxy silane | 7.5 | 310 |
| 2% allyl triethoxy silane | 6 | 420 |
| 3% allyl triethoxy silane | 4.5 | 340 |
| 1% allyl ethyl diethoxy silane | 7 | 300 |
| 2% allyl ethyl diethoxy silane | 6.5 | 350 |
| 3% allyl ethyl diethoxy silane | 6 | 330 |
| 1% vinyl tributoxy silane | 7.5 | 300 |
| 2% vinyl tributoxy silane | 5.5 | 460 |
| 3% vinyl tributoxy silane | 4.5 | 420 |
| 1% B chloroallyl triethoxy silane | 6.5 | 350 |
| 2% B chloroallyl triethoxy silane | 5.5 | 400 |
| 3% B chloroallyl triethoxy silane | 4.0 | 340 |

The examples further illustrate this invention but the invention is not restricted to these examples and modifications may be made without departing from the spirit of this invention.

We claim:
1. Copolymer of .5 to 5% by weight of a chemical compound having the formula

$$X-\underset{\underset{Z}{|}}{\overset{\overset{Y}{|}}{Si}}-Y$$

wherein X is a radical of 2-8 carbon atoms selected from the group consisting of allyl, methallyl, β-chloroallyl and vinyl, wherein Y is a radical having from 1 to 6 carbon atoms and selected from the group consisting of methoxy, ethoxy phenoxy, methyl and ethyl radicals, and wherein Z is a radical having from 1 to 6 carbon atoms and selected from the group consisting of methoxy, ethoxy, butoxy and phenoxy radicals, and of 99.5 to 95 percent by weight of a substance selected from the group consisting of unsubstituted and chloro substituted methyl, ethyl, butyl and furfuryl esters of acrylic and methacrylic acids.

2. The copolymer of claim 1 wherein X is a vinyl radical.

3. The copolymer of claim 1 wherein Y and Z are methoxy radicals.

4. Copolymer of .5 to 5% by weight of a chemical compound having the formula $$X-\underset{\underset{Z}{|}}{\overset{\overset{Y}{|}}{Si}}-Y$$

wherein X is a radical of 2-8 carbon atoms selected from the group consisting of allyl, methallyl, β-chloroallyl, and vinyl, wherein Y is a radical having 1 to 6 carbon atoms and selected from the group consisting of methoxy, ethoxy, phenoxy, methyl, and ethyl radicals, and wherein Z is a radical having from 1-6 carbon atoms and selected from the group consisting of methoxy, ethoxy, butoxy, and phenoxy radicals and 99.5 to 95% by weight of ethyl acrylate.

5. Copolymer of .5 to 5% by weight of vinyl triethoxysilane and of 99.5 to 95% by weight of a substance selected from the group consisting of unsubstituted and chloro substituted methyl, ethyl, butyl and furfuryl esters of acrylic and methacrylic acids.

6. Copolymer of .5 to 5% by weight of a vinyl trimethoxy silane and of 99.5 to 95% by weight of a substance selected from the group consisting of unsubstituted and chloro substituted methyl, ethyl, butyl and furfuryl esters of acrylic and methacrylic acids.

7. Copolymer of .5 to 5% by weight of a chemical compound having the formula $$X-\underset{\underset{Z}{|}}{\overset{\overset{Y}{|}}{Si}}-Y$$

wherein X is a radical of 2-8 carbon atoms selected from the group consisting of allyl, methallyl, β-chloroallyl, and vinyl wherein Y is a radical having from 1-6 carbon atoms and selected from the group consisting of methoxy, ethoxy, phenoxy, methyl and ethyl radicals and wherein Z is a radical having from 1 to 6 carbon atoms and selected from the group consisting of methoxy, ethoxy, butoxy, and phenoxy radicals and of 99.5 to 95% by weight of methyl methacrylate.

8. Copolymer of .5 to 5% by weight of vinyl triethoxy silane and of 99.5 to 95% ethyl acrylate.

9. Copolymer of .5 to 5% by weight of vinyl trimethoxy silane and of 99.5 to 95% methyl methacrylate.

10. Copolymer of .5 to 5% by weight of vinyl triethoxy silane and of 99.5 to 95% methyl methacrylate.

References Cited in the file of this patent

UNITED STATES PATENTS

| | | |
|---|---|---|
| 2,532,583 | Tyran et al. | July 24, 1945 |
| 2,628,246 | MacKenzie et al. | Feb. 10, 1953 |

OTHER REFERENCES

Wagner et al.: Ind. and Engineering Chem., vol. 45, No. 2, Feb. 1953, page 371.